United States Patent
Hiltgen (10) Patent No.: US 9,628,942 B2
(45) Date of Patent: Apr. 18, 2017

(54) SECURITY ENHANCEMENT FOR SHORT-RANGE WIRELESS TOKENS

(71) Applicant: UBS AG, Zürich (CH)

(72) Inventor: Alain Hiltgen, Birmensdorf (CH)

(73) Assignee: UBS AG, Zurich (CH)

( * ) Notice: Subject to any disclaimer, the term of this patent is extended or adjusted under 35 U.S.C. 154(b) by 0 days.

(21) Appl. No.: 14/652,731

(22) PCT Filed: Dec. 20, 2012

(86) PCT No.: PCT/EP2012/005307
§ 371 (c)(1),
(2) Date: Jun. 16, 2015

(87) PCT Pub. No.: WO2014/094802
PCT Pub. Date: Jun. 26, 2014

(65) Prior Publication Data
US 2015/0334515 A1    Nov. 19, 2015

(51) Int. Cl.
*H04W 4/00* (2009.01)
*G06K 19/077* (2006.01)

(52) U.S. Cl.
CPC ...... *H04W 4/008* (2013.01); *G06K 19/07749* (2013.01)

(58) Field of Classification Search
None
See application file for complete search history.

(56) References Cited

U.S. PATENT DOCUMENTS

| | | | |
|---|---|---|---|
| 5,751,570 A | 5/1998 | Stobbe et al. | |
| 7,893,815 B2 | 2/2011 | Friedrich | |
| 2004/0257204 A1 | 12/2004 | Liao et al. | |
| 2009/0256684 A1* | 10/2009 | Fukuda | G06K 19/0723 340/10.3 |
| 2010/0167641 A1* | 7/2010 | Virtanen | G06F 1/3287 455/41.1 |

(Continued)

OTHER PUBLICATIONS

Search Report and Written Opinion issued for International Application No. PCT/EP2012/005307, dated Dec. 4, 2013.

(Continued)

*Primary Examiner* — Alejandro Rivero
(74) *Attorney, Agent, or Firm* — Pillsbury Winthrop Shaw Pittman LLP (57) ABSTRACT

An approach for facilitating secured use of short-range wireless tokens is disclosed. In some implementations, a short-range wireless token may be wirelessly powered based on the short-range wireless token being within a powering range of an electromagnetic field of a user device. The short-range wireless token may be configured to generate output signals while being powered. The output signals of the short-range wireless token may be disabled while the short-range wireless token continues to be powered by the electromagnetic field based on a predetermined condition determined by the short-range wireless token. The output signals of the short-range wireless token may be re-enabled based on a discontinuing of the powering of the short-range wireless token by the electromagnetic field and then a resuming of the powering of the short-range wireless token by the electromagnetic field.

20 Claims, 7 Drawing Sheets

(56) References Cited

U.S. PATENT DOCUMENTS

2012/0129450 A1* 5/2012 Lee ..................... H04M 1/7253
455/41.1
2012/0238206 A1* 9/2012 Singh .................. H04L 63/0492
455/41.1

OTHER PUBLICATIONS

International Preliminary Report on Patentability issued for International Application No. PCT/EP2012/005307, dated Dec. 8, 2014.

* cited by examiner

SECURITY ENHANCEMENT FOR SHORT-RANGE WIRELESS TOKENS

CROSS REFERENCE TO RELATED APPLICATIONS

This application is the U.S. National Phase of PCT/EP2012/005307, filed Dec. 20, 2012, the content of which is incorporated herein by reference in its entirety.

FIELD OF THE DISCLOSURE

The present disclosure relates generally to short-range wireless tokens and, more specifically, to facilitating secured use of short-range wireless tokens.

BACKGROUND

In recent years, near-field communication (NFC) tokens have been utilized for user identification (e.g., in border control), user authentication (e.g., for online banking services), transaction authentication (e.g., debit/credit card payments), and/or other authentications. For example, customers may utilize mobile devices with an integrated NFC reader and a mobile banking application to request a communication session with a banking service. To authenticate a requested communication session, a customer may be required to physically bring an NFC authentication token associated with the customer's account in close proximity to his/her mobile device so that the NFC authentication token may wirelessly provide verification information for authenticating the customer to the banking service. Often, however, customers may keep their mobile devices and NFC authentication tokens together in close proximity. For example, for convenience purposes, a customer may physically attach an NFC authentication token to a mobile device, may keep the NFC authentication token and the mobile device in the same pocket, etc. Typically, as a result, the NFC authentication tokens remain powered and continue to operate as usual, subjecting those customers to information exposure risks, for instance, from malware on the mobile devices that may gain unauthorized access to information on the NFC authentication tokens while the NFC authentication tokens remain powered.

SUMMARY

One aspect of the disclosure relates to methods, apparatuses, and/or systems for facilitating secured use of short-range wireless tokens. In one implementation, a method may comprise: wirelessly powering a short-range wireless token based on the short-range wireless token being within a powering range of an electromagnetic field of a user device, the short-range wireless token configured to generate output signals while being powered; disabling the output signals of the short-range wireless token while the short-range wireless token continues to be powered by the electromagnetic field based on a predetermined condition determined by the short-range wireless token; and re-enabling the output signals of the short-range wireless token based on a discontinuing of the powering of the short-range wireless token by the electromagnetic field and then a resuming of the powering of the short-range wireless token by the electromagnetic field.

In another implementation, a short-range wireless token may comprise a powering module, a processor, and/or other components. The powering module may be configured to cause the short-range wireless token to wirelessly power based on the short-range wireless token being within a powering range of an electromagnetic field of a user device. The processor may be configured to cause the short-range wireless token to: generate output signals while being powered; and disable the output signals while the short-range wireless token continues to be powered by the electromagnetic field based on a predetermined condition. The output signals may be re-enabled based on a discontinuing of the powering of the short-range wireless token by the electromagnetic field and then a resuming of the powering of the short-range wireless token by the electromagnetic field.

In another implementation, a method may comprise: wirelessly powering a short-range wireless token based on the short-range wireless token being within a powering range of an electromagnetic field of a user device, the short-range wireless token configured to generate output signals while being powered; disabling the output signals of the short-range wireless token while the short-range wireless token continues to be powered by the electromagnetic field based on a predetermined condition determined by the short-range wireless token; and resetting the short-range wireless token to re-enable the output signals based on a manipulation of the short-range wireless token, the user device, or a combination thereof.

In another implementation, a short-range wireless token may comprise a powering module, a processor, and/or other components. The powering module may be configured to cause the short-range wireless token to wirelessly power based on the short-range wireless token being within a powering range of an electromagnetic field of a user device. The processor may be configured to cause the short-range wireless token to: generate output signals while being powered; and disable the output signals while the short-range wireless token continues to be powered by the electromagnetic field based on a predetermined condition. The short-range wireless token may be reset to re-enable the output signals based on a manipulation of the short-range wireless token, the user device, or a combination thereof.

These and other features of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The present disclosure is illustrated by way of example, and not by way of limitation, in the figures of the accompanying drawing and in which like reference numerals refer to similar elements and in which.

DETAILED DESCRIPTION

Examples for facilitating secured use of short-range wireless tokens are disclosed. In the following description, for the purposes of explanation, numerous specific details are set forth in order to provide a thorough understanding of the implementations of the invention. It is apparent, however, to one skilled in the art that the implementations of the invention may be practiced without these specific details or with an equivalent arrangement. In other instances, well-known structures and devices are shown in block diagram form in order to avoid unnecessarily obscuring the implementations of the invention.

Figure 1:
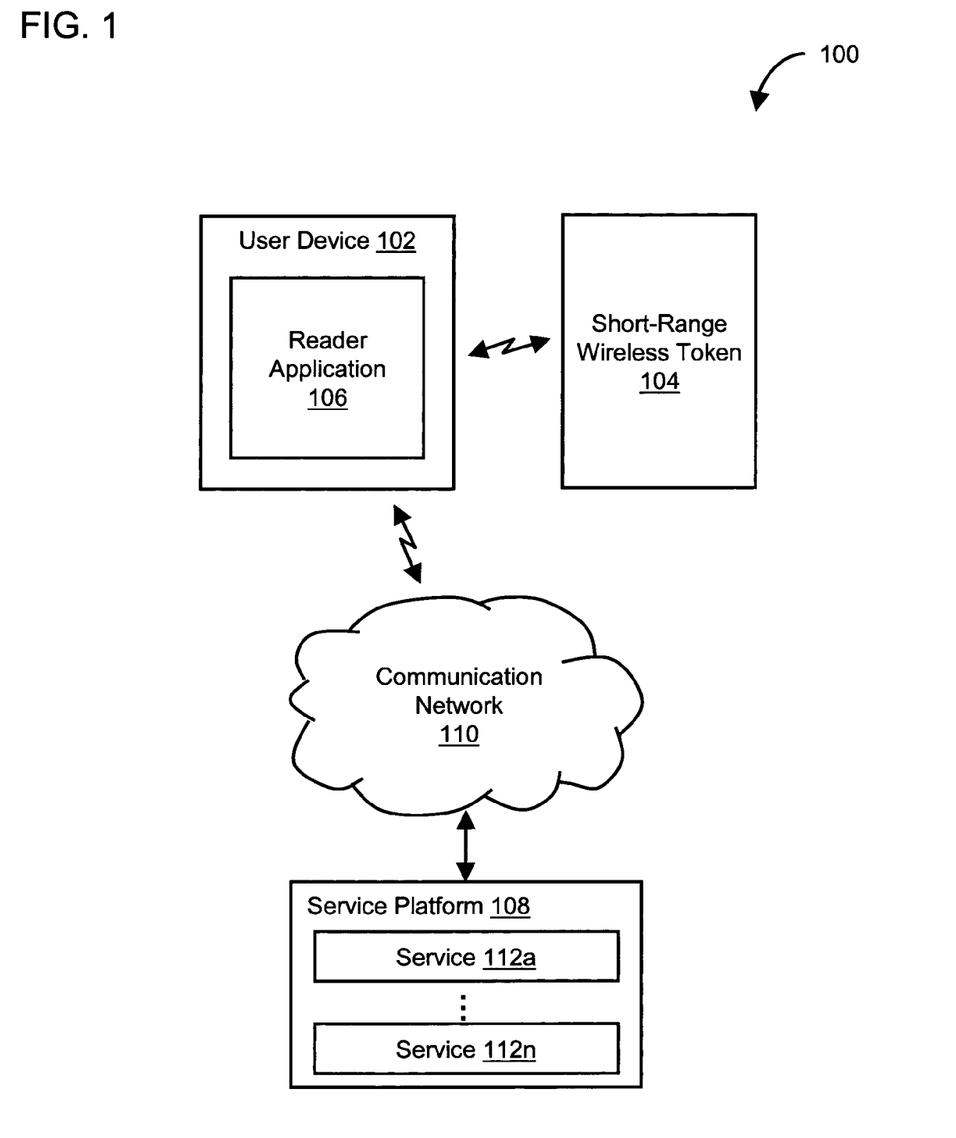
FIG. 1 is a diagram of a system capable of facilitating secured use of short-range wireless tokens, in accordance with one or more implementations.

FIG. 1 is a diagram of a system 100 capable of facilitating secured use of short-range wireless tokens, in accordance with one or more implementations. As discussed, customers may keep their mobile devices and NFC authentication tokens together in close proximity by physically attaching an NFC authentication token to a mobile device, keeping the NFC authentication token and the mobile device in the same pocket, etc. Among other issues, such actions subject those customers to information exposure risks since the NFC authentication tokens typically remain powered and continue to operate as usual. As an example, malware on a mobile device that is in close proximity to an NFC authentication token may misuse the NFC authentication token to cause the NFC authentication token to transmit verification information (e.g., signatures, one-time passwords, etc.) and/or other information obtainable by the NFC authentication token to one or more unauthorized entities via the mobile device.

To address the above issues, the system 100 may offer short-range wireless tokens with security enhancements, discourage risky user behaviors, and/or provide other advantages. It should be noted that, although various implementations are described with respect to secured use of short-range wireless tokens, it is contemplated that the approaches described herein may be utilized in other ways. It should also be noted that, although various implementations are described with respect to passive short-range wireless tokens (e.g., passive NFC tokens), it is contemplated that the approaches described herein may apply to active short-range wireless tokens and/or other tokens (e.g., other types of wireless tokens, non-wireless tokens, etc.). It should further be noted that, although various implementations are described with respect to authentication tokens, it is contemplated that the approaches described herein may apply to other types of tokens. As used herein, tokens may refer to cards, dongles, tags, and/or other tokens, with or without PIN protection. Short-range wireless tokens may refer to tokens that communicate via NFC, Bluetooth, radio frequency (RF), and/or other short-range wireless technologies.

As shown in FIG. 1, the system 100 may include a user device 102 (or multiple user devices 102) configured to communicate with a short-range wireless token 104. For example, the user device 102 may include an integrated token reader interface, along with a reader application 106, to communicate with the short-range wireless token 104 to obtain verification information and/or other information accessible by the short-range wireless token 104. The user device 102 may be configured to communicate with a service platform 108 via the communication network 110 to request access to one or more services 112a-112n of the service platform 108.

By way of example, the short-range wireless token 104 may be wirelessly powered based on the short-range wireless token 104 being within a powering range of an electromagnetic field of the user device 102. The short-range wireless token 104 may be configured to generate output signals while being powered. The output signals of the short-range wireless token 104 may be disabled while the short-range wireless token 104 continues to be powered by the electromagnetic field based on a predetermined condition determined by the short-range wireless token 104. In certain implementations, the output signals of the short-range wireless token 104 may be re-enabled based on a discontinuing of the powering of the short-range wireless token 104 by the electromagnetic field and then a resuming of the powering of the short-range wireless token 104 by the electromagnetic field.

For example, the user device 102 may comprise an NFC reader. The short-range wireless token 104 may comprise an NFC token, for instance, that is capable of interacting with the NFC reader. In one scenario, a user may utilize a mobile device to initiate a banking application to perform financial transaction with a bank via an online banking service. The banking application may, for instance, work in conjunction with the NFC reader to communicate with the short-range wireless token 104 via the NFC token. The banking application may prompt the user to key in a PIN and bring the short-range wireless token 104 in close proximity (e.g., 4 cm or less) to the mobile device to authenticate the user to use the banking service, to authenticate a transaction with the banking service, etc. When the user brings the short-range wireless token 104 in close proximity (e.g., 4 cm or less) to the mobile device, the short-range wireless token 104 may become electrically powered by the electromagnetic field of the mobile device. As a result, the short-range wireless token 104 may send an Answer-to-Select (ATS) response to the mobile device. The mobile device may then send one or a series of commands (e.g., getData→getAuthenticationCode) to the short-range wireless token 104, which may execute the commands to provide the mobile device with verification information for authenticating the user, a transaction, etc.

In this scenario, after completion of the predefined series of commands (e.g., a response associated with the last command has been outputted to the mobile device), a mute mode of the short-range wireless token 104 may be activated, causing a disabling of the output signals of the short-range wireless token 104. Thus, although the short-range wireless token 104 continues to be powered by the electromagnetic field of the mobile device, the short-range wireless token 104 may be prevented from transmitting information outside the short-range wireless token 104. In this way, the risk of unauthorized access of information that is accessible via the short-range wireless token 104 may be reduced, for instance, despite user behaviors associated with security risks (e.g., keeping their NFC authentication tokens in close proximity to their mobile devices).

However, upon the powering of the short-range wireless token 104 by the electromagnetic field being discontinued and then resumed, the output signals of the short-range wireless token 104 may be re-enabled. In certain implementations, the discontinuing of the powering of the short-range wireless token 104 and then the resuming of the powering may be based on the short-range wireless token 104 being placed outside the powering range and then back within the powering range. In various implementations, the discontinuing of the powering of the short-range wireless token 104 and then the resuming of the powering may be based on the electromagnetic field of the mobile device being deactivated and then reactivated. In some implementations, the re-enabling of the output signals may be based on a deactivating of the mute mode of the short-range wireless token 104. The deactivating of the mute mode may, for instance, be in response to the discontinuing of the powering of the short-range wireless token 104.

Figure 2A:
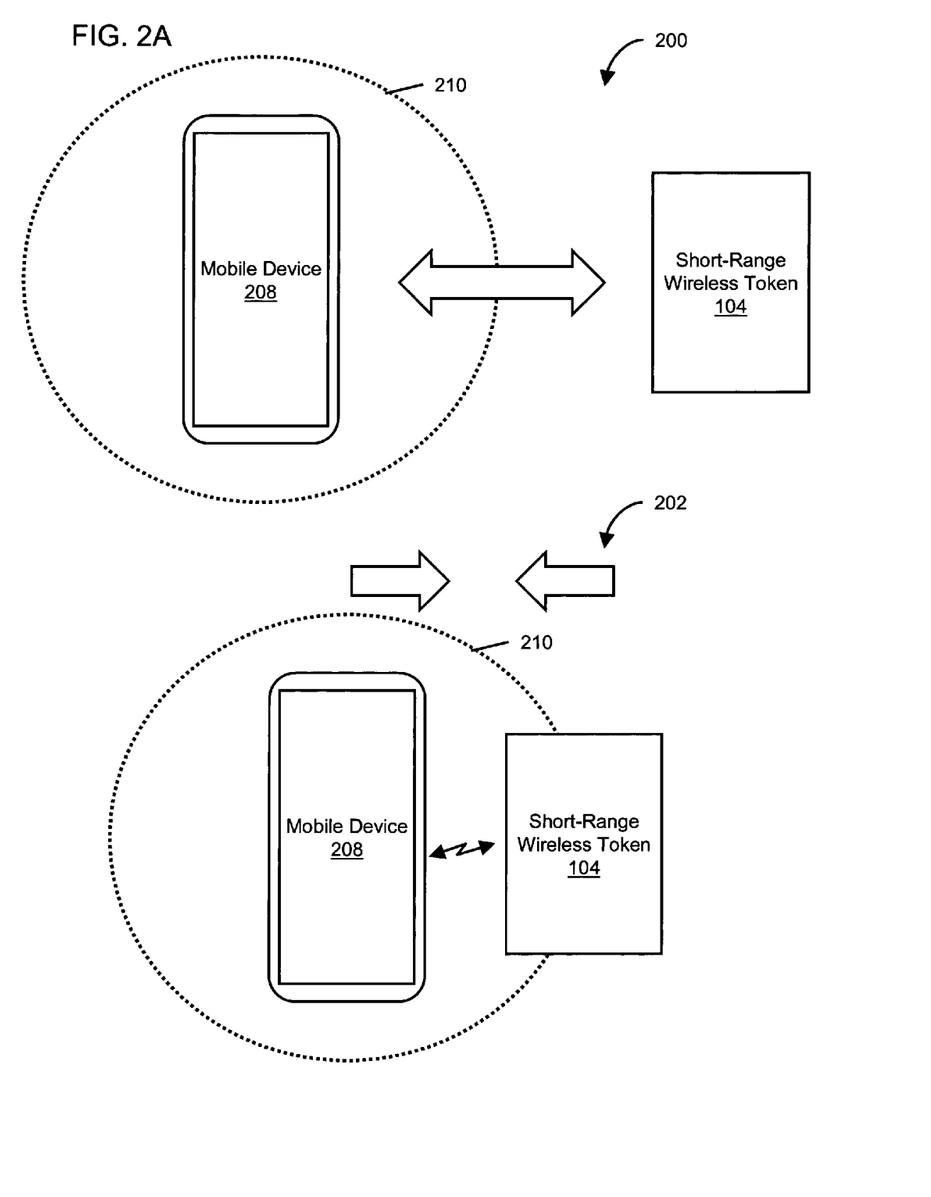
FIGS. 2A and 2B are diagrams illustrating events that cause powering of a short-range wireless token by an electromagnetic field of a user device (e.g., a mobile device) to be discontinued and then resumed, in accordance with one or more implementations.
Figure 2B:
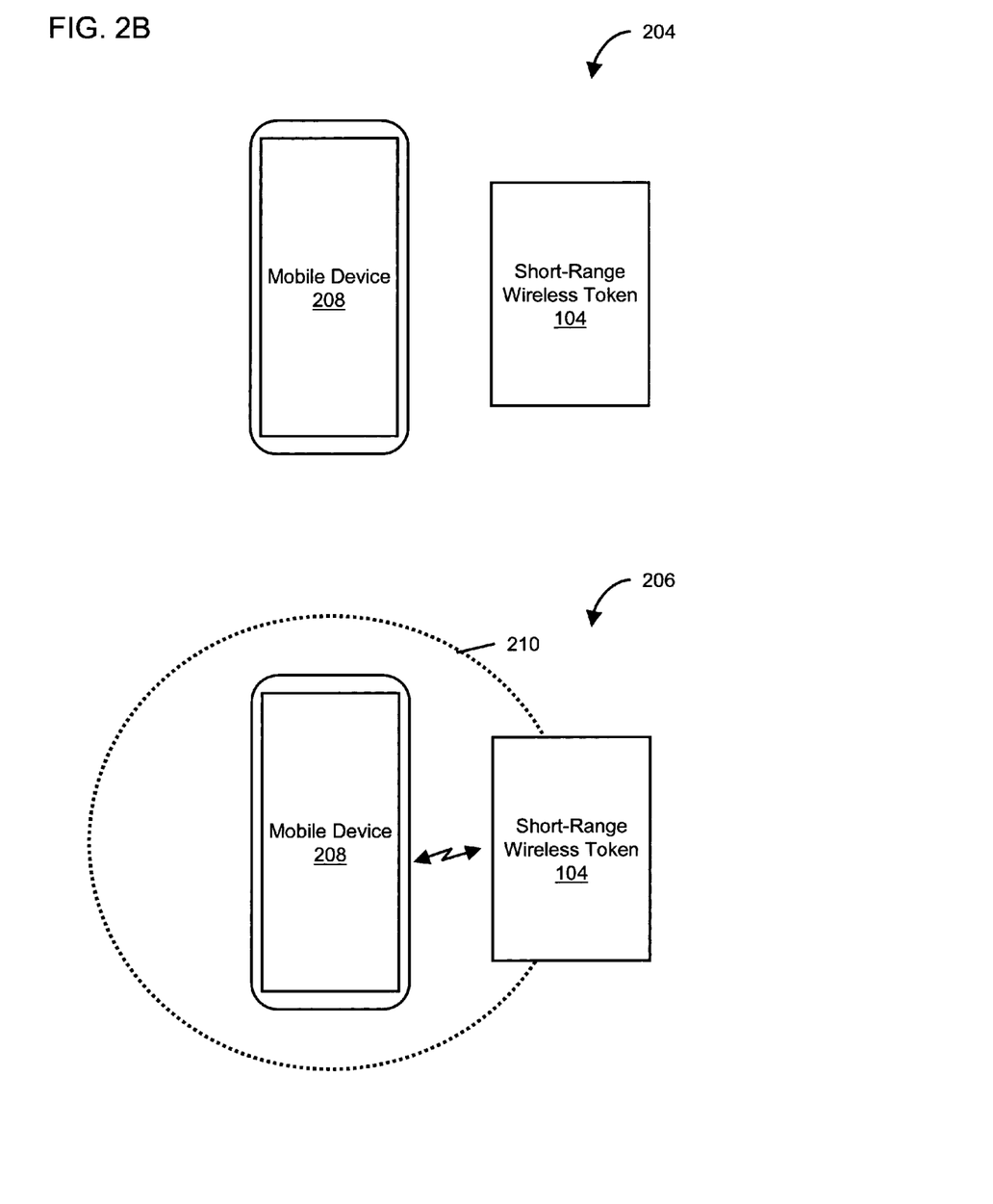

For example, FIGS. 2A and 2B are diagrams illustrating events 200, 202, 204, and/or 206 that cause powering of short-range wireless token 104 by an electromagnetic field of a mobile device to be discontinued and then resumed, in accordance with one or more implementations. As shown in FIG. 2A, event 200 depicts moving of the short-range wireless token and/or a mobile device 208 to place the short-range wireless token 104 outside of a powering range 210 of an electromagnetic field of the mobile device 208. Event 202 depicts moving of the short-range wireless token 104 and/or the mobile device 208 to place the short-range wireless token 104 back within the powering range 210.

In one use case, based on a predetermined condition (e.g., executions of a particular command or command series exceed an execution threshold number, a time threshold related to inactivity is reached, and/or other predetermined conditions) determined by the short-range wireless token 104, a mute mode of the short-range wireless token 104 may be activated by indicating the "activated" mute mode status in a global transient variable. As indicated, the activating of the mute mode may cause the output signals of the short-range wireless token to become disabled. In some scenarios, the activating of the mute mode may still allow communications (e.g., commands) to be received, but may prevent the communications from being processed. In response to event 200, the short-range wireless token 104 may become unpowered. The short-range wireless token 104 may, for instance, become unpowered as a result of a lack of power from the mobile device 208 since the short-range wireless token is no longer within the powering range 210. Subsequently, in response to event 202, the short-range wireless token 104 may regain power. The short-range wireless token 104 may, for instance, regain power from the electromagnetic field as a result of being back within the powering range 210. Because the "activated" mute mode status was stored in a global transient variable, the loss of power from event 200 may cause the variable to reset to a default "deactivated" state (e.g., from "1" to "0" as a result of becoming unpowered, from "activated" to "deactivated," etc.) so that the output signals may be re-enabled when the short-range wireless token 104 regains power from the electromagnetic field.

As shown in FIG. 2B, event 204 depicts a deactivating of the electromagnetic field of the mobile device 208. Event 206 depicts a reactivating of the electromagnetic field of the mobile device 208. In response to event 204, the short-range wireless token 104 may become unpowered. The short-range wireless token 104 may, for instance, become unpowered as a result of a lack of power from the mobile device 208 since the mobile device 208 is no longer emitting the electromagnetic field to power the short-range wireless token. Subsequently, in response to event 206, the short-range wireless token 104 may regain power as the mobile device 208 re-emits the electromagnetic field. If, for instance, a mute mode of the short-range wireless token 104 is activated by indicating the "activated" mute mode status in a global transient variable, the loss of power from event 204 may cause the variable to reset to a default "deactivated" state (e.g., from "1" to "0" as a result of becoming unpowered, from "activated" to "deactivated," etc.) so that the output signals may be re-enabled when the short-range wireless token 104 regains power from the electromagnetic field.

In some implementations, the events 200, 202, 204, and/or 206 may be performed by a user of the short-range wireless token 104 to cause the re-enabling of the output signals of the short-range wireless token 104. Thus, users of such short-range wireless tokens 104 may perform one or more steps to cause the discontinuing and then the resuming of the powering of their short-range wireless tokens 104 to re-enable the output signals of the short-range wireless tokens 104 when their risky user behaviors (e.g., keeping their NFC authentication tokens in close proximity to their mobile devices) results in the disabling of the output signals. Accordingly, users may be encouraged to mitigate such user behaviors, for instance, to avoid the inconvenience of having to effectuate the discontinuing and then the resuming of the powering of their short-range wireless tokens 104 in order to re-enable the output signals of the short-range wireless tokens 104.

In various implementations, the short-range wireless token 104 may be reset to re-enable the output signals based on a manipulation of the short-range wireless token 104, the user device 102, or a combination thereof. By way of example, the short-range wireless token 104 may include a reset switch for re-enabling the output signals. In one use case, a user of the short-range wireless token 104 may press the reset switch to cause the short-range wireless token 104 to reboot. The reboot may include a discontinuing and then a resuming of the powering of the short-range wireless token 104. The discontinuing and then the resuming of the powering of the short-range wireless token 104 may, for instance, cause an activated mute mode of the short-range wireless token 104 to be deactivated, resulting in a re-enabling of the output signals of the short-range wireless token 104. In another use case, pressing of the reset switch may change a mute mode status of the short-range wireless token 104 from "activated" to "deactivated," resulting in a re-enabling of the output signals. For example, if the short-range wireless token 104 is configured to retain the mute mode status even after a discontinuing of the powering, the reset switch may be utilized to deactivate an activated mute mode of the short-range wireless token 104. The deactivating of the mute mode may, for instance, result in the re-enabling of the output signals of the short-range wireless token 104.

By way of another example, the user device 102 may include a reset switch for re-enabling the output signals. In one scenario, a user of the user device 102 may press the reset switch to cause a short-range wireless interface (e.g., an NFC reader that emits the electromagnetic field) of the user device 102 to reboot. The reboot may include a deactivating and a reactivating of the electromagnetic field emitted by the user device 102 (e.g., the deactivating and the reactivating of the electromagnetic field of the mobile device 208 that are illustrated by events 204 and 206 of FIG. 2B). Thus, the reboot of the short-range wireless interface of the user device 102 may cause a discontinuing and a resuming of the powering of the short-range wireless token 104 by the electromagnetic field of the user device 102. As indicated, the discontinuing and the resuming of the powering may result in a re-enabling of the output signals of the short-range wireless token 104.

As indicated, in certain implementations, the disabling of the output signals of the short-range wireless token may be based on a number of predetermined conditions. The predetermined conditions may, for instance, trigger the disabling of the output signals to reduce access of information via the short-range wireless token 104 by malware, to discourage risky user behavior, and/or provide other benefits. For example, in one implementation, the short-range wireless token 104 may receive a request by the user device 102 for verification information to establish a session between the user device 102 and a network service. The short-range wireless token 104 may initiate execution of one or more predetermined commands to provide the verification information to the user device 102. In some implementations, the predetermined condition from which a disabling of the output signals of the short-range wireless token 104 is based may include the execution of the predetermined commands being completed a predetermined threshold number of times.

In one use case, a predefined series of commands (e.g., getData→getAuthenticationCode) may be utilized by the short-range wireless token 104 to generate the verification information requested by the user device 102. If, for instance, the predetermined threshold execution number is set to "1," the mute mode of the short-range wireless token may be activated upon completing execution of the predefined series of commands (e.g., a response associated with the last command has been outputted to the user device 102), resulting in a disabling of the output signals of the short-range wireless token 104. Thus, based on the predetermined threshold execution number being "1," the short-range wireless token 104 may be restricted to executing the predefined series of commands once per powering of the short-range wireless token 104.

In another implementation, the short-range wireless token 104 may detect a passage of a predetermined time duration after a triggering event. The triggering event may, for instance, include detection of the electromagnetic field of the user device 102 (e.g., by the short-range wireless token 104), receipt of a command from the user device 102, sending of a response by the short-range wireless token 104 to the user device 102, setup of a session between the user device 102 and the short-range wireless token 104, and/or other events. For example, if the first command (e.g., getData) of a predefined series of commands (e.g., getData→getAuthenticationCode) has not been executed within 7 seconds of the electromagnetic field detection or of the ATS response being sent to the user device 102, the mute mode of the short-range wireless token 104 may be activated to disable the output signals of the short-range wireless token 104.

In another implementation, the short-range wireless token 104 may detect an indication of a security violation. In some implementations, the predetermined condition may include the detection of the security violation indication. In one scenario, the short-range wireless token 104 may be protected with a PIN such that the user device 102 may authenticate a session between the user device 102 and the short-range wireless token by providing a PIN associated with the short-range wireless token 104 to the short-range wireless token 104 during setup of the session. If, for instance, malware on the user device 102 attempts to initiate a session with the short-range wireless token 104 using an incorrect PIN, the mute mode of the short-range wireless token 104 may be activated to disable the output signals of the short-range wireless token 104. In another scenario, a user may authenticate a session between the user device 102 and the short-range wireless token 104 by entering a PIN associated with the short-range wireless token 104 (e.g., when prompted, before requesting the session via an application on the user device 102, etc.). However, if the number of times that the user enters an incorrect PIN exceeds a predetermined threshold number of attempts, the mute mode of the short-range wireless token 104 may be activated to disable the output signals of the short-range wireless token 104.

In another implementation, the short-range wireless token 104 may detect a deviation from one or more predetermined ranges of the short-range wireless token 104 with respect to available power, temperature, electromagnetic field strength, or a combination thereof. In some implementations, the predetermined condition may include the detection of the deviation from the predetermined ranges of the short-range wireless token 104. In one use case, a sudden increase in the electromagnetic field strength during a session between the user device 102 and the short-range wireless token 104 may indicate that another device (e.g., belonging to an eavesdropper) is attempting to access information from the short-range wireless token 104. Thus, the sudden increase in the electromagnetic field strength may trigger the mute mode of the short-range wireless token 104 to be activated, resulting in a disabling of the output signals of the short-range wireless token. In another scenario, the short-range wireless token 104 may be configured to work with user devices 102 that emit an electromagnetic field that satisfies one or more predetermined standards (e.g., strength, frequency, and/or other criteria). For example, if an electromagnetic field emitted by a mobile device does not fall within a range of the predetermined standards, the mute mode of the short-range wireless token 104 may be activated to prevent the short-range wireless token 104 from working with that particular mobile device (e.g., via disabling of the output signals of the short-range wireless token 104).

In another implementation, the short-range wireless token 104 may comprise an NFC token (e.g., passive NFC token, active NFC token, etc.). The user device 102 may comprise an NFC reader, for instance, that is configured to interact with the NFC token. It should be noted that, although certain implementations are described with respect to NFC technologies, it is contemplated that the approaches described herein may be applied using other wireless technologies.

The communication network 110 of system 100 may include one or more networks such as a data network, a wireless network, a telephony network, and/or other communication networks. It is contemplated that the data network may be any local area network (LAN), metropolitan area network (MAN), wide area network (WAN), a public data network (e.g., the Internet), short range wireless network, and/or any other suitable packet-switched network. The wireless network may, for example, be a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium (e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth, Internet Protocol (IP) data casting, satellite, mobile ad-hoc network (MANET), etc.).

The user device 102 may be any type of mobile terminal, fixed terminal, and/or other device. For example, the user device 102 may include a desktop computer, a notebook computer, a netbook computer, a tablet computer, a smartphone, a navigation device, an electronic book device, a gaming device, a point-of-sale (POS) device, an automated teller machine (ATM), and/or any other user device. In some implementations, the user device 102 may be the accessories and peripherals of these devices. It is also contemplated that the user device 102 may support any type of interface to the user (such as "wearable" circuitry, etc.).

Figure 3:
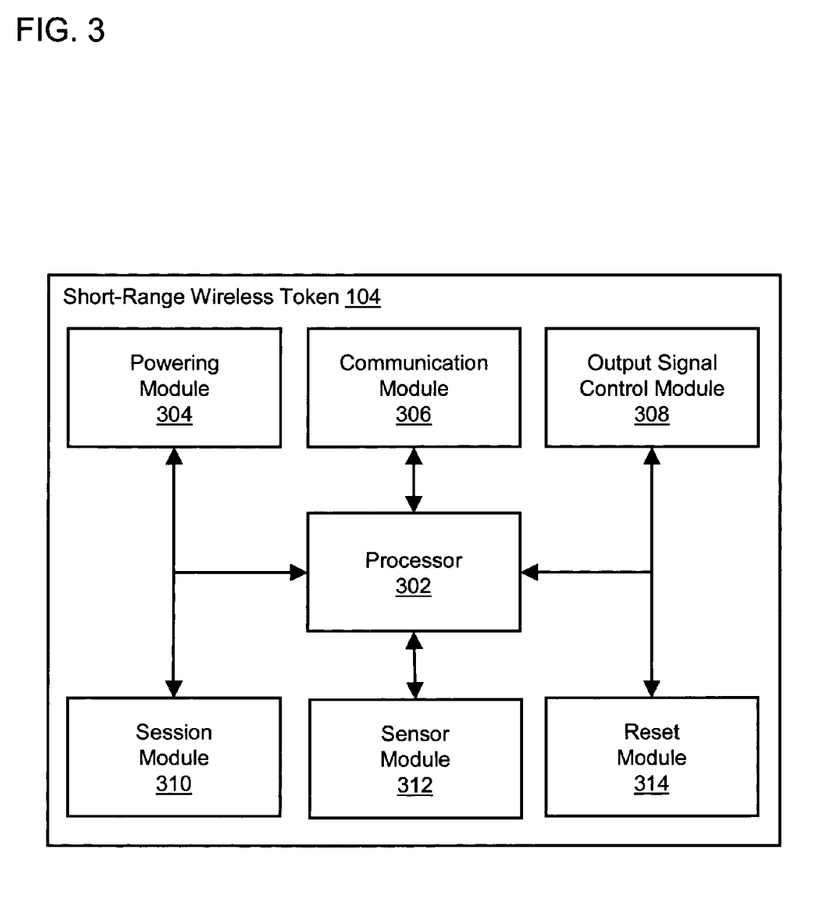
FIG. 3 is a diagram of the components of a short-range wireless token, in accordance with one or more implementations.

FIG. 3 is a diagram of the components of a short-range wireless token 104, in accordance with one or more implementations. By way of example, the short-range wireless token 104 may include one or more components for facilitating its secured use. It is contemplated that the operations of these components may be combined in one or more components or performed by other components of equivalent functionality. In one implementation, the short-range wireless token 104 may include a processor 302, a powering module 304, a communication module 306, an output signal control module 308, a session module 310, a sensor module 312, a reset module 314, and/or other modules.

The processor 302 may include and/or have access to one or more electronic storage media to store information. The processor 302 may execute one or more modules (e.g., computer program modules and/or other modules) of the short-range wireless token 104 to facilitate one or more operations of the modules. For example, in some implementations, the processor 302 may interact with the powering module 304 to cause the short-range wireless token 104 to wirelessly power based on detecting that the short-range wireless token 104 is within a powering range of an electromagnetic field of the user device 102. In one implementation, the powering module 304 may verify whether the short-range wireless token 104 may be powered by the electromagnetic field of the user device 102 before allowing the supply of power from the electromagnetic field to reach other components of the short-range wireless token 104 (e.g., to avoid shorting other components of the short-range wireless token 104, to restrict the powering of the short-range wireless token 104 to certain user devices 102 that satisfy a particular standards set, etc.).

In certain implementations, the powering module 304 may include a powering circuit that may be configured to automatically power the short-range wireless token 104 based on the short-range wireless token 104 being within the powering range of the electromagnetic field of the user device 102. In one use case, the powering circuit may include one or more inductors and/or other components that derive current from the electromagnetic field to power the short-range wireless token 104 (e.g., without direction from a computer program module, based on instructions of a computer program modules, etc.).

In various implementations, the processor 302 may work with the communication module 306 to facilitate communication with other components of the short-range wireless token 104, among the other components of the short-range wireless token 104, with devices external to the short-range wireless token 104 (e.g., a mobile device), and/or other components of the system 100. As an example, the communication module 306 may receive a request from the user device 102 for verification information to establish a session between the user device 102 and a network service, a session to access protected information at the user device 102, and/or other sessions (e.g., by authenticating a user, a transaction, etc.). Subsequently, the communication module 306 may forward the request to the session module 310 for processing. As another example, the communication module 306 may generate and transmit output signals associated with the verification information to provide the verification information to the user device 102 in response to the generation of the verification information by the session module 310.

In certain implementations, the processor 302 may interact with the output signal control module 308 to disable output signals of the short-range wireless token 104 based on a predetermined condition (e.g., executions of a particular command or command series exceed an execution threshold number, a time threshold related to inactivity is reached, and/or other predetermined conditions). For example, in response to detecting an occurrence of a predetermined condition, the output signal control module 308 may activate a mute mode of the short-range wireless token 104. The activating of the mute mode may, for instance, result in the disabling of the output signals.

In some implementations, the output signals of the short-range wireless token 104 may be re-enabled based on a discontinuing and then a resuming of the powering of the short-range wireless token by the electromagnetic field of the user device 102. By way of example, upon the discontinuing of the powering, the mute mode of the short-range wireless token 104 may be deactivated as a result of the loss of power associated with the short-range wireless token 104. Subsequently, upon the resuming of the powering and the short-range wireless token 104 regaining power, the output signals of the short-range wireless token 104 may be re-enabled. In one implementation, the output signal control module 308 may effectuate the deactivating of the mute mode of the short-range wireless token to cause re-enabling of the output signals. For example, if the "activated" status of the mute mode continues to persist upon the discontinuing of the powering by the electromagnetic field (e.g., the short-range wireless token 104 remains powered, the "activated" status is saved in a non-transient variable, etc.), the output signal control module 308 may change the "activated" status to a "deactivated" status upon detecting the discontinuing and then the resuming of the powering by the electromagnetic field.

In certain implementations, the processor 302 may utilize the session module 310 to initiate setup of a session between the user device 102 and the short-range wireless token 104, to process requests for verification information to authenticate a user or a transaction, and/or to perform other session-related operations. For example, upon receiving a verification information request, the session module 310 may initiate execution of one or more predetermined commands to generate the verification information so that the verification information may be provided to a requesting device (e.g., the user device 102). In one implementation, the session module 310 may keep track of the number of executions of the predetermined commands that has completed, for instance, since the last re-enabling of the output signals of the short-range wireless token 104, the last reset of the short-range wireless token 104, the last resuming of the powering of the short-range wireless token 104, etc. Upon a threshold execution number being exceed, for instance, the session module 310 may indicate to the output signal control module 308 to activate the mute mode of the short-range wireless token 104 to cause disabling of the output signals of the short-range wireless token 104.

In various implementations, the processor 302 may utilize the sensor module 312 to determine sensor information. In one scenario, the sensor module 312 may be utilized to detect a deviation from one or more predetermined ranges of the short-range wireless token 104 with respect to available power, temperature, electromagnetic field strength, and/or other environmental variables. Such deviations may, for instance, cause the sensor module 312 to trigger the output signal control module 308 to activate the mute mode of the short-range wireless token 104 to cause disabling of the output signals of the short-range wireless token 104.

In some implementations, the processor 302 may utilize the reset module 314 to reset the short-range wireless token 104. The reset module 314 may, for instance, reset the short-range wireless token 104 based on a manipulation of the short-range wireless token 104, the user device 102, and/or other devices. In one use case, for instance, the short-range wireless token 104 may include a reset switch for re-enabling the output signals. When the reset switch is pressed by a user, the reset module 314 may cause the short-range wireless token 104 to reboot. The reboot may include a discontinuing and then a resuming of the powering of the short-range wireless token 104. The discontinuing and then the resuming of the powering of the short-range wireless token 104 may, for instance, cause an activated mute mode of the short-range wireless token 104 to be deactivated, resulting in a re-enabling of the output signals of the short-range wireless token 104.

Figure 4:
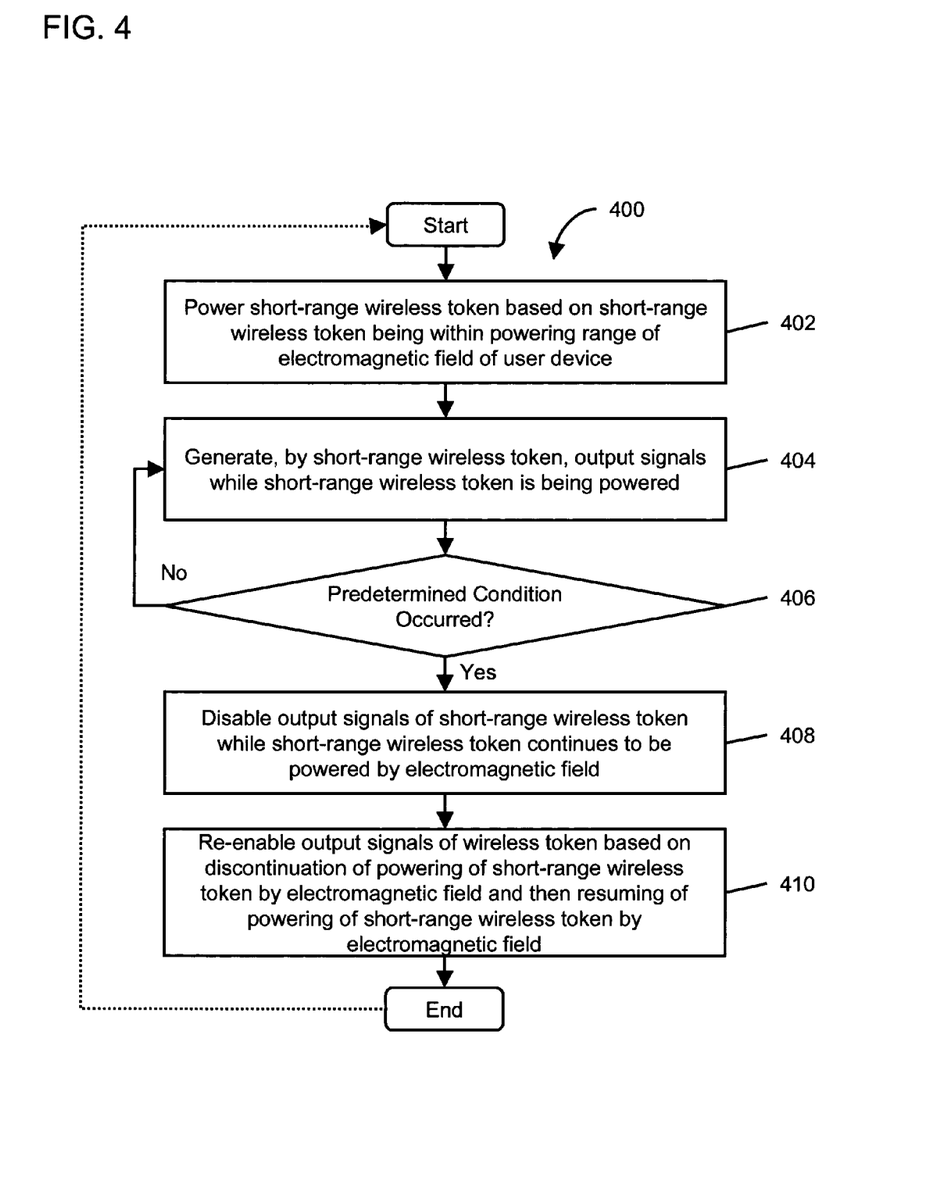
FIG. 4 is a flowchart of a process for facilitating secured use of short-range wireless tokens, in accordance with one or more implementations.

FIG. 4 is a flowchart of a process for facilitating secured use of short-range wireless tokens, in accordance with one or more implementations. The operations of process 400 presented below are intended to be illustrative. In some implementations, process 400 may be accomplished with one or more additional operations not described, and/or without one or more of the operations discussed. Additionally, the order in which the operations of process 400 are illustrated in FIG. 4 and described below is not intended to be limiting.

At an operation 402, the short-range wireless token 104 may be powered based on the short-range wireless token 104 being within a powering range of an electromagnetic field of the user device 102. The powering range may, for instance, be any range capable of powering the short-range wireless token 104 by the electromagnetic field of the user device 102 such that the short-range wireless token 104 is enabled to communicate wirelessly with the user device 102 based on the powering by the electromagnetic field. However, in some implementations, the powering range may be 4 cm or less and/or other similar ranges. Operation 402 may be performed by a powering module that is the same as or similar to powering module 304, in accordance with one or more implementations.

At an operation 404, output signals may be generated by the short-range wireless token 104 while the short-range wireless token 104 is being powered. By way of example, execution of one or more predetermined commands may be executed at the short-range wireless token 104 to generate verification information for establishing a session (e.g., a session between user device 102 and a network service, a session for accessing information on the user device 102, and/or other sessions). The verification information may, for instance, include authentication information to authenticate a user, a transaction, etc. Output signals corresponding to the verification information may be generated so that the verification information may be provided to user device 102 to establish the session. Operation 404 may be performed by a communication module that is the same as or similar to communication module 306, in accordance with one or more implementations.

At an operation 406, a determination of whether a predetermined condition has occurred may be effectuated. For example, the predetermined condition may include: (1) execution of one or more predetermined commands to provide verification information to the user device 102 being completed a predetermined threshold number of times; (2) detection of a passage of a predetermined time duration after a triggering event; (3) detection of an indication of a security violation; (4) detection of a deviation from one or more predetermined ranges of the short-range wireless token 104 with respect to available power, temperature, electromagnetic field strength, or a combination thereof; and/or (5) other predetermined conditions. Operation 406 may be performed by a session module and/or a sensor module that is the same as or similar to session module 310 and/or sensor module 312, in accordance with one or more implementations. Responsive to a determination that the predetermined condition has occurred, process 400 may proceed to an operation 408.

At operation 408, the short-range wireless token 104 may be powered based on the short-range wireless token 104 being within a powering range of an electromagnetic field of the user device 102. In some implementations, a mute mode of the short-range wireless token 104 may be activated based on the predetermined condition to cause the disabling of the output signals. Operation 408 may be performed by a output signal control module that is the same as or similar to output signal control module 308, in accordance with one or more implementations.

At an operation 410, the output signals of the short-range wireless token 104 may be re-enabled based on a discontinuing of the powering of the short-range wireless token 104 by the electromagnetic field and then a resuming of the powering of the short-range wireless token 104 by the electromagnetic field. In various implementations, the re-enabling of the output signals may be based on a deactivating of the mute mode that is in response to the discontinuing of the powering of the short-range wireless token 104. In some implementations, the discontinuing of the powering of the short-range wireless token 104 and then the resuming of the powering may be based on the short-range wireless token 104 being placed outside the powering range and then back within the powering range. In certain implementations, the discontinuing of the powering of the short-range wireless token 104 and then the resuming of the powering may be based on the electromagnetic field of the user device 102 being deactivated and then reactivated. Operation 410 may be performed by a output signal control module that is the same as or similar to output signal control module 308, in accordance with one or more implementations. As indicated, in some implementations, the short-range wireless token 104 may be configured such that the output signals may be re-enabled in response the resuming of the powering of the short-range wireless token 104 after the discontinuing of the powering causes the mute mode of the short-range wireless token 104 to be deactivated.

Figure 5:
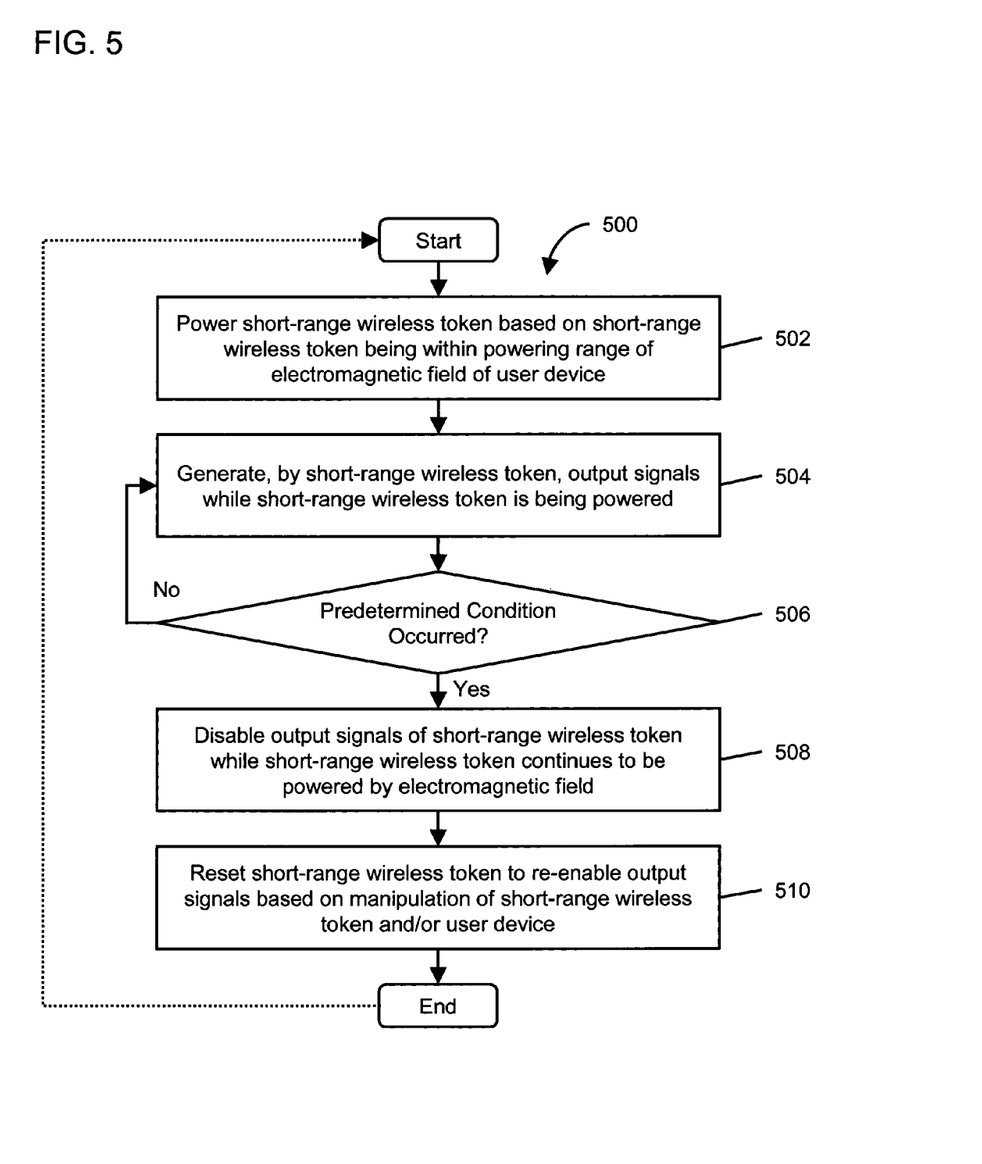
FIG. 5 is a flowchart of another process for facilitating secured use of short-range wireless tokens, in accordance with one or more implementations.

FIG. 5 is a flowchart of another process for facilitating secured use of short-range wireless tokens, in accordance with one or more implementations. The operations of process 500 presented below are intended to be illustrative. In some implementations, process 500 may be accomplished with one or more additional operations not described, and/or without one or more of the operations discussed. Additionally, the order in which the operations of process 500 are illustrated in FIG. 5 and described below is not intended to be limiting.

As shown, operations 502, 504, 506, and/or 508 may be the same as or similar to operations 402, 404, 406, and/or 408, in accordance with one or more implementations. Thus, in some implementations, operations 502, 504, 506, and/or 508 may be performed by a powering module, a communication module, an output signal control module, a session module, and/or a sensor module that are the same as or similar to powering module 304, communication module 306, output signal control module 308, session module 310, and/or sensor module 312.

At an operation 510, the short-range wireless token 104 may be reset to re-enable the output signals based on a manipulation of short-range wireless token 104, the user device 102, or a combination thereof. By way of example, the short-range wireless token 104 may include a physical reset switch that may be triggered by a user of short-range wireless token 104. The short-range wireless token 104 may, for instance, be reset to enable the output signals in response to the triggering of the physical reset switch on the short-range wireless token 104 by the user. Operation 510 may be performed by a reset module that is the same as or similar to reset module 314, in accordance with one or more implementations. As indicated, in some implementations, the short-range wireless token 104 may be configured such that the resetting of the short-range wireless token may cause the discontinuing of the powering of the short-range wireless token 104. The discontinuing of the powering may, for instance, cause the mute mode of the short-range wireless token 104 to become deactivated such that the output signals may be re-enabled upon the resuming of the powering of short-range wireless token 104.

Figure 6:
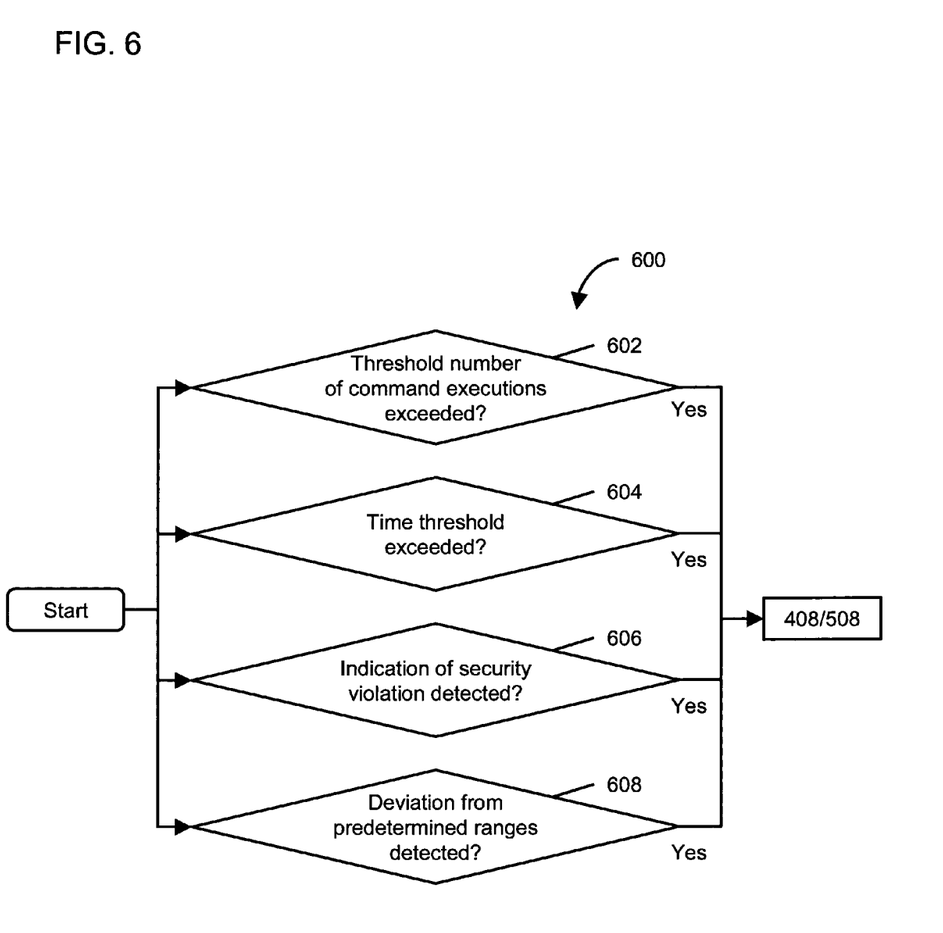
FIG. 6 is a flowchart of a process for facilitating detection of a predetermined condition for disabling output signals of a short-range wireless token, in accordance with one or more implementations.

FIG. 6 is a flowchart of a process for facilitating detection of a predetermined condition for disabling output signals of a short-range wireless token, in accordance with one or more implementations. The operations of process 600 presented below are intended to be illustrative. In some implementations, process 600 may be accomplished with one or more additional operations not described, and/or without one or more of the operations discussed. Additionally, the order in which the operations of process 600 are illustrated in FIG. 6 and described below is not intended to be limiting.

At operation 602, a determination of whether executions of one or more predetermined commands have exceeded a threshold number of executions may be effectuated. In some implementations, the short-range wireless token 104 may receive a request by the user device 102 for verification information to authenticate a user, a transaction, or a combination thereof. Execution of the predetermined commands may be initiated to provide the verification information to the user device 102. Upon completion of the execution of the predetermined commands, for instance, the determination of whether the threshold execution number has been exceeded may be effectuated. Operation 602 may be performed by a session module that is the same as or similar to session module 310, in accordance with one or more implementations. Responsive to a determination that the threshold execution number has been exceeded, process 600 may proceed to operation 408 of FIG. 4 and/or operation 508 of FIG. 5.

At operation 604, a determination of whether a time threshold has been exceeded may be effectuated. In certain implementations, a timer may be initiated in response to a triggering event. The triggering event may, for instance, include detection of the electromagnetic field of the user device 102 (e.g., by the short-range wireless token 104), receipt of a command from the user device 102, sending of a response by the short-range wireless token 104 to the user device 102, setup of a session between the user device 102 and the short-range wireless token 104, and/or other events. The determination of whether the time threshold has been exceeded may be based on the passage of time indicated by the timer. Operation 604 may be performed by a session module that is the same as or similar to session module 310, in accordance with one or more implementations. Responsive to a determination that the time threshold has been exceeded, process 600 may proceed to operation 408 of FIG. 4 and/or operation 508 of FIG. 5.

At operation 606, a determination of whether an indication of a security violation has been detected may be effectuated. A security violation may, for instance, be indicated where attempted access of the short-range wireless token 104 has failed a predetermined threshold number of times, where incorrect PINs have been used to attempt the access of the short-range wireless token 104, and/or in other scenarios. Operation 606 may be performed by a session module that is the same as or similar to session module 310, in accordance with one or more implementations. Responsive to a determination that the security violation indication has been detected, process 600 may proceed to operation 408 of FIG. 4 and/or operation 508 of FIG. 5.

At operation 608, a determination of whether a deviation from one or more predetermined ranges of the short-range wireless token 104 has been detected may be effectuated. The predetermined ranges of short-range wireless token may, for instance, be with respect to available power, temperature, electromagnetic field strength, or a combination thereof. Operation 608 may be performed by a session module that is the same as or similar to session module 310, in accordance with one or more implementations. Responsive to a determination that the deviation from the predetermined ranges of the short-range wireless token 104 has been detected, process 600 may proceed to operation 408 of FIG. 4 and/or operation 508 of FIG. 5.

With respect to FIGS. 4, 5, and 6, in various implementations, one or more operations of processes 400, 500, and/or 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of processes 400, 500, and/or 600 in response to instructions stored electronically on an electronic storage medium. The one or more processing devices may include one or more devices configured through hardware, firmware, and/or software to be specifically designed for execution of one or more of the operations of processes 400, 500, and/or 600.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A method for facilitating secured use of short-range wireless tokens, the method comprising:
   wirelessly powering a short-range wireless token based on the short-range wireless token being within a powering range of an electromagnetic field of a user device, the short-range wireless token configured to generate output signals while being powered;
   disabling the output signals of the short-range wireless token while the short-range wireless token continues to be powered by the electromagnetic field based on a predetermined condition determined by the short-range wireless token such that the short-range wireless token is prevented from re-enabling the output signals for at least as long as the short-range wireless token continues to be powered by the electromagnetic field; and
   re-enabling the output signals of the short-range wireless token based on a discontinuing of the powering of the short-range wireless token by the electromagnetic field and then a resuming of the powering of the short-range wireless token by the electromagnetic field.

2. The method of claim 1, further comprising:
   activating a mute mode of the short-range wireless token based on the predetermined condition to cause the disabling of the output signals by setting the mute mode as activated in a transient variable based on the predetermined condition,
   wherein the re-enabling of the output signals is based on a deactivating of the mute mode that is in response to the discontinuing of the powering of the short-range wireless token.

3. The method of claim 1, wherein the discontinuing of the powering of the short-range wireless token and then the resuming of the powering is based on the short-range wireless token being placed outside the powering range and then back within the powering range.

4. The method of claim 1, wherein the discontinuing of the powering of the short-range wireless token and then the resuming of the powering is based on the electromagnetic field of the user device being deactivated and then reactivated.

5. The method of claim 1, further comprising:
   receiving, by the short-range wireless token, a request by the user device for verification information to authenticate a user, a transaction, or a combination thereof; and
   initiating execution of one or more predetermined commands to provide the verification information to the user device,
   wherein the predetermined condition includes the execution of the predetermined commands being completed a predetermined threshold number of times.

6. The method of claim 1, further comprising:
   detecting, by the short-range wireless token, a passage of a predetermined time duration after a triggering event,
   wherein the predetermined condition includes the detection of the passage of the predetermined time duration.

7. The method of claim 1, further comprising:
   detecting, by the short-range wireless token, an indication of a security violation,
   wherein the predetermined condition includes the detection of the security violation indication.

8. The method of claim 1, further comprising:
   detecting, by the short-range wireless token, a deviation from one or more predetermined ranges of the short-range wireless token with respect to available power, temperature, electromagnetic field strength, or a combination thereof,
   wherein the predetermined condition includes the detection of the deviation from the predetermined ranges of the short-range wireless token.

9. The method of claim 1, wherein the short-range wireless token comprises a near-field communication (NFC) token, and the user device comprises an NFC reader.

10. A short-range wireless token for facilitating secured use of short-range wireless tokens, the short-range wireless token comprising:
    a powering module configured to cause the short-range wireless token to be wirelessly powered based on the short-range wireless token being within a powering range of an electromagnetic field of a user device; and
    a physical processor configured to cause the short-range wireless token to: generate output signals while being powered; and disable the output signals while the short-range wireless token continues to be powered by the electromagnetic field based on a predetermined condition such that the short-range wireless token is prevented from re-enabling the output signals for at least as long as the short-range wireless token continues to be powered by the electromagnetic field, wherein the output signals are re-enabled based on a discontinuing of the powering of the short-range wireless token by the electromagnetic field and then a resuming of the powering of the short-range wireless token by the electromagnetic field.

11. The short-range wireless token of claim 10, wherein the physical processor is configured to cause the short-range wireless token to activate a mute mode of the short-range wireless token based on the predetermined condition to cause the disabling of the output signals by setting the mute mode as activated in a transient variable based on the predetermined condition, wherein the output signals are re-enabled based on a deactivating of the mute mode that is in response to the discontinuing of the powering of the short-range wireless token.

12. The short-range wireless token of claim 10, wherein the discontinuing of the powering of the short-range wireless token and then the resuming of the powering is based on the short-range wireless token being placed outside the powering range and then back within the powering range.

13. The short-range wireless token of claim 10, wherein the discontinuing of the powering of the short-range wireless token and then the resuming of the powering is based on the electromagnetic field of the user device being deactivated and then reactivated.

14. The short-range wireless token of claim 10, wherein the physical processor is configured to cause the short-range wireless token to:
    receive a request by the user device for verification information to authenticate a user, a transaction, or a combination thereof; and
    initiate execution of one or more predetermined commands to provide the verification information to the user device, wherein the predetermined condition includes the execution of the predetermined commands being completed a predefined threshold number of times.

15. The short-range wireless token of claim 10, wherein the physical processor is configured to cause the short-range wireless token to detect a passage of a predetermined time duration after a triggering event, and wherein the predetermined condition includes the detection of the passage of the predetermined time duration.

16. The short-range wireless token of claim 10, wherein the physical processor is configured to cause the short-range wireless token to detect an indication of a security violation, and wherein the predetermined condition includes the detection of the security violation indication.

17. The short-range wireless token of claim 10, wherein the physical processor is configured to cause the short-range wireless token to detect a deviation from one or more predetermined ranges of the short-range wireless token with respect to available power, temperature, electromagnetic field strength, or a combination thereof, and wherein the predetermined condition includes the detection of the deviation from the predetermined ranges of the short-range wireless token.

18. A method for facilitating secured use of short-range wireless tokens, the method comprising:
wirelessly powering a short-range wireless token based on the short-range wireless token being within a powering range of an electromagnetic field of a user device, the short-range wireless token configured to generate output signals while being powered;
disabling the output signals of the short-range wireless token while the short-range wireless token continues to be powered by the electromagnetic field based on a predetermined condition determined by the short-range wireless token such that the short-range wireless token is prevented from re-enabling the output signals for at least as long as the short-range wireless token continues to be powered by the electromagnetic field; and
resetting the short-range wireless token to re-enable the output signals based on a manipulation of the short-range wireless token, the user device, or a combination thereof.

19. The method of claim 18, wherein the short-range wireless token comprises at least one physical processor and at least one computer program module, wherein the disabling of the output signals based on the predetermined condition is caused by the at least one processor executing the at least one computer program module.

20. The method of claim 18, wherein the predetermined condition includes: (1) execution of one or more predetermined commands to provide verification information to the user device being completed a predetermined threshold number of times; (2) detection of a passage of a predetermined time duration after a triggering event; (3) detection of an indication of a security violation; (4) detection of a deviation from one or more predetermined ranges of the short-range wireless token with respect to available power, temperature, electromagnetic field strength, or a combination thereof or (5) a combination thereof.

* * * * *